United States Patent
Juric

(10) Patent No.: US 7,212,815 B1
(45) Date of Patent: May 1, 2007

(54) QUALITY EVALUATION METHOD

(75) Inventor: Pero Juric, Bellach (CH)

(73) Assignee: Ascom (Schweiz) AG, Bern (CH)

( * ) Notice: Subject to any disclaimer, the term of this patent is extended or adjusted under 35 U.S.C. 154(b) by 0 days.

(21) Appl. No.: 09/647,173

(22) PCT Filed: Mar. 3, 1999

(86) PCT No.: PCT/CH99/00102

§ 371 (c)(1),
(2), (4) Date: Nov. 14, 2000

(87) PCT Pub. No.: WO99/50991

PCT Pub. Date: Oct. 7, 1999

(30) Foreign Application Priority Data

Mar. 27, 1998 (EP) .................................. 98810269

(51) Int. Cl.
*H04Q 7/20* (2006.01)
*H03C 1/62* (2006.01)

(52) U.S. Cl. ................ 455/423; 455/115.2; 455/115.1; 455/67.14

(58) Field of Classification Search ............. 455/115.2, 455/115.1, 423, 63.1, 39, 67.11, 67.13, 67.14, 455/68, 69, 91, 222; 340/653
See application file for complete search history.

(56) References Cited

U.S. PATENT DOCUMENTS

| | | | | |
|---|---|---|---|---|
| 4,258,314 A | * | 3/1981 | Hirata | 324/620 |
| 4,622,660 A | * | 11/1986 | Cowans et al. | 369/134 |
| 5,555,507 A | * | 9/1996 | Wolf et al. | 702/122 |
| 5,794,188 A | * | 8/1998 | Hollier | 704/228 |
| 6,271,771 B1 | * | 8/2001 | Seitzer et al. | 341/20 |
| 6,405,147 B1 | * | 6/2002 | Fera | 702/112 |
| 6,427,133 B1 | * | 7/2002 | Paping et al. | 704/201 |

FOREIGN PATENT DOCUMENTS

EP A2644674 3/1995

OTHER PUBLICATIONS

Wang et al., IEEE, vol. 10, No. 5, pp. 819-829 (1992).

* cited by examiner

*Primary Examiner*—Joseph Feild
*Assistant Examiner*—S. Smith
(74) *Attorney, Agent, or Firm*—Birch, Stewart, Kolasch & Birch, LLP

(57) ABSTRACT

The invention relates to a method for evaluating the quality of a signal transmission path (2) presenting non-linear distortions. According to said method a specified test signal is sent from a transmitter (1) to a receiver (3). First the level of the received signal is adjusted in the receiver (3) and then a global quality evaluation is carried out using a specified comparative method. To adjust the signal level a local quality evaluation (11) based on the specified comparative method is carried out in a specified number of different, predefined windows (V1, à, VN–1, VN). Thereafter at least one window with an adequate local transmission quality is determined. The ratio of signal level of the test signal to signal level of the received signal is calculated in at least one window and the level of the entire received signal is adjusted on the basis of this ratio. Preferably only windows containing, for example, at least 50% of the total signal energy are used for adjusting the level. The quality evaluation can be carried out using a known method such as the BSD method.

13 Claims, 3 Drawing Sheets

QUALITY EVALUATION METHOD

This application is the national phase under 35 U.S.C. § 371 of PCT International Application No. PCT/CH99/00102 which has an International filing date of Mar. 3, 1999, which designated the United States of America.

TECHNICAL FIELD

The invention relates to a method for performing a quality assessment of a signal transmission link having non-linear distortion, in which a predetermined test signal is transmitted from a transmitter to a receiver, the level of the received signal is first adjusted in the receiver and then a global quality assessment is performed by means of a predetermined comparison method.

PRIOR ART

The objective measurement of the transmission quality of voice signals is gaining more and more importance as mobile radio telephony is becoming more and more widespread and with competition among the various network operators. There are different methods for measuring the transmission quality. Of particular interest are those which take into consideration the properties of human hearing and provide for an automatic quality assessment which essentially corresponds to the subjective perception of a test person (compare, e.g., Shihua Wang et al., "An Objective Measure for Predicting Subjective Quality of Speech Coders", IEEE Journal on Selected Areas in Communications, Vol. 10 No. 5, June 1992, pp. 819–829, or EP 0 722 164 A1).

All methods foe quality assessment are based on a comparison of the undistorted test signal with the received signal distorted by the transmission. It is known that a prerequisite for an informative comparison is that the level of the received signal is correctly matched to that of the undistorted test signal.

EP 0 644 674 A2 discloses a method of assessing the transmission quality of a voice transmission link on the basis of a transmitted predetermined test sequence. The (synchronized) teat sequence is divided up into a multiplicity of time intervals, the phonetic properties being digitized for each time interval and a corresponding intermediate value formed. With the aid of a neural network, the transmission quality is assessed on the basis of the totality of the intermediate values as good, moderate or poor.

The methods for rapid real-time control of the signal previously known (compare, e.g., ITU-T Recommendation P. 52) largely ignore the effects of the distortions on the determination of the correct level. The problems are explained as follows:

during the measurement of the transmission quality of a mobile radio system, a mobile test set is driven through the area to be tested, with the aim of obtaining an analysis of the radio coverage which more 5 or less covers the area. It is a familiar phenomenon that mobile radio channels are subject to time-and frequency-selective fading and that, as a consequence, the transmission quality can vary very rapidly and severely. Real-time measurements in the field are thus confronted with greatly varying signal levels (and non-linear disturbances) which are not known in advance.

The known methods for level control are not found to be satisfactory in the presence of severe signal distortion. This is because severe disturbances (echoes, impulse noise, call interruptions) are subconciously interpreted as component parts of the signal and can lead to excessive or, respectively, insufficient amplification. This falsifies the result of the quality assessment.

DESCRIPTION OF THE INVENTION

It is the object of the invention to specify a method of the type initially mentioned which avoids the disadvantages existing in the prior art and essentially does not have any interfering influence on the result of the quality assessment even in the presence of severe non-linear distortion.

The solution to the object is defined by the features of Claim 1. According to the invention, the received signal is only examined in some selected time windows for the purpose of level control. The said windows are specified in advance in such a manner that they contain the highest possible spectral energy density of the (undistorted) test signal. The signal received distorted is subjected to a comparison with the signal pattern in the selected windows. The comparison method is the same one which is also subsequently used for assessing the transmission quality. Next, the window is determined in which the best transmission quality or signal similarity has been found. In this window, the ratio of signal levels is then determined in a manner known per se. Finally, the entire signal (i.e. also the signal outside the windows examined) is amplified in accordance with the ratio found.

The core of the invention is that not all of the received signal energy is used for determining the gain factor required for the level control, but only those signal sections which have minimum distortion. As it were, a first assessment of the transmission quality is being performed within the level control. This assessment, however, is restricted to signal sections (windows) having a high energy density. This makes it possible to keep down the influence of any disturbances right from the start. The disturbances will not be of the same magnitude in all windows. Where they are small, the "local" signal quality provisionally determined will be good. Accordingly, the gain factor determined "locally" will be affected only minimally by non-linear disturbances.

The windows to be defined for the level control are specified by an analysis of the predetermined test signal. The test signal is subjected to a spectrum analysis in which those signal sections are identified, the energy of which exceeds a suitably selected threshold.

The threshold is preferably selected in such a manner that the windows or signal sections which meet the required condition contain at least 50% of the energy of the total signal overall. In the case of test signals having very locally concentrated energy, the threshold can be easily placed in such a manner that at least $2/3$ to $3/4$ (e.g. about 70%) of the total signal energy falls into the selected windows.

In the field of mobile radio telephony, a voice signal (e.g. a sentence spoken by a test person) is preferably used as the test signal. The windows are selected in such a manner that they do not contain any silence intervals. Only signal sections with voice activity are of interest.

A suitable method for determining the signal quality is the calculation of the BSD Bark Spectral Distance). However, other methods can also be easily used (Cepstral, etc.). Using the same quality assessment method in the determination of the gain factor for the selected signal sections as in the subsequent analysis of the total signal results in optimum processing or pre-processing of the (distorted) received signal.

Further advantageous embodiments and combinations of features of the invention are found in the subsequent detailed description and the totality of the patent Claims.

BRIEF DESCRIPTION OF THE DRAWINGS

In the drawings used for explaining the exemplary embodiment.

In principle, identical parts are provided with identical reference symbols in the figures.

APPROACHES FOR CARRYING OUT THE INVENTION

Figure 1:
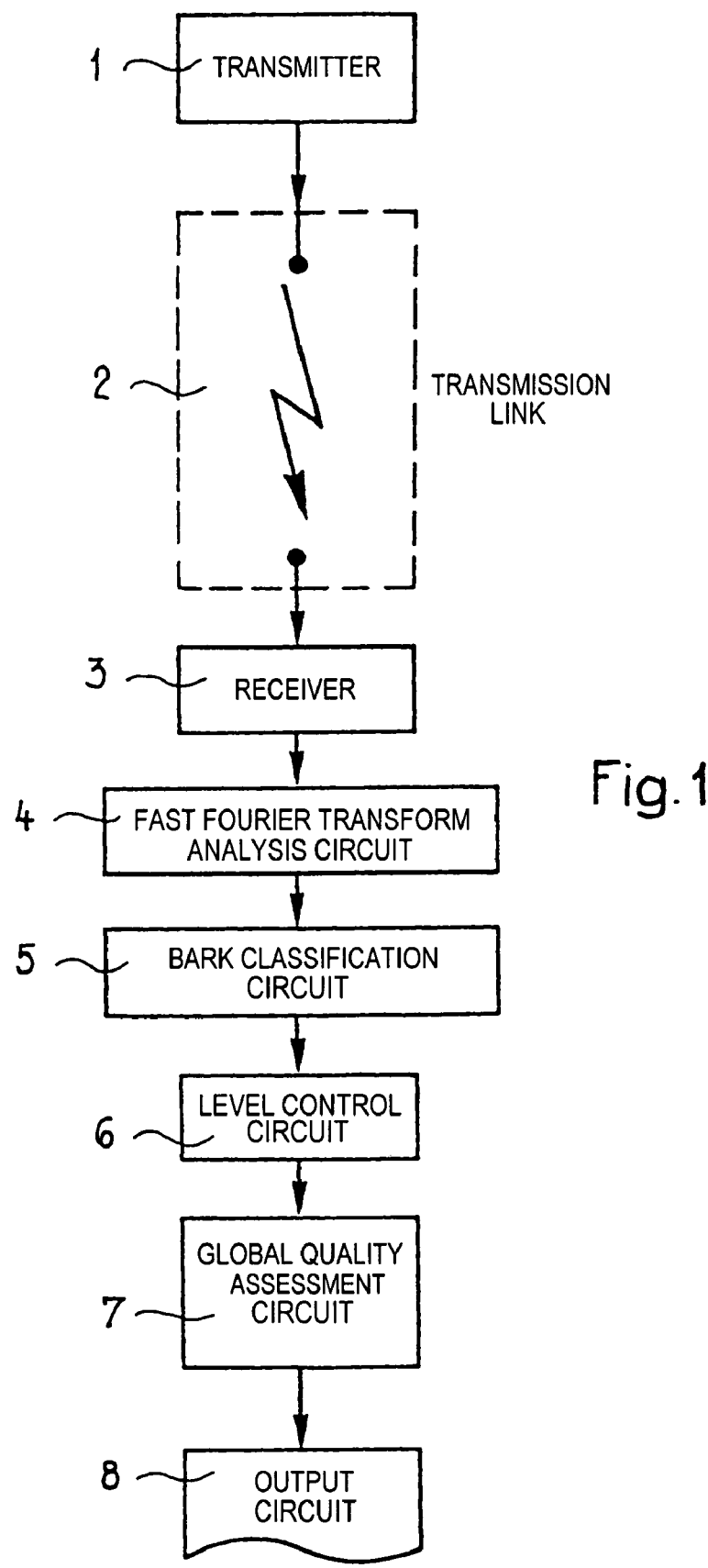
FIG. 1 shows a block diagram of the method for assessing the transmission quality.

FIG. 1 diagrammatically shows the sequence, known per se, of a method for assessing the transmission quality. A transmitter 1 sends a test signal which is known in advance. The transmitter 1 is, for example, a test set which, on the one hand, comprises the circuit arrangement of a commercially available mobile radio telephone and, on the other hand, a circuit for generating and injecting the test signal into the mobile radio circuit. The test signal is, for example, a voice signal which is repeated several times. This is stored in a memory and is digitally forwarded to the mobile radio circuit. This simulates a mobile radio user who is speaking to a party at the other end of the line.

The test signal is transmitted via the transmission link 2. If it is a matter of assessing the transmission quality of a mobile radio system, the transmission link then includes both one or more radio links and an arbitrary number of line-connected transmission sections. At least one of the radio links (e.g. the one from the in each case current base station to the test set) is subject to severe non-linear distortion. This is because brief interruptions can occur as a result of which corresponding sections of the test signal are lost.

At the other end of the transmission link 2 there is the receiver 3. This, in turn, comprises a telephone circuit in order to decode the transmission signal and to output it in a digital format for the subsequent analysis. Furthermore, it carries out the synchronization so that the subsequent signal processing is synchronized with the beginning of the (repetitively transmitted) voice signal.

For the sake of simplicity, FIG. 1 only shows one direction of the signal transmission. Naturally, the same functionality can be given in the reverse direction so that the transmission quality can be determined in both directions.

Following the receiver 3, an FFT (Fast Fourier Transform) analysis 4 is performed. The resultant spectra are then subjected to a Bark classification 5. That is to say the frequencies are combined into groups or bands which correspond to the sensitivity of the human ear, in accordance with the Bark scale.

The received signal thus processed is next raised to the level required for the subsequent quality assessment 7 by means of the level control 6 according to the invention. An arbitrary comparison method can be used for the quality assessment, the values obtained in the same manner from the test signal during system development having been stored as reference in a memory. The output 8 of the quality assessment 7 can indicate, for example, the dependence on time of the quality values that have been determined. Since it is known where the mobile test set has been at a particular time, conclusions can be drawn, for example, with respect to local problems of the radio link.

In the text which follows, the basic principles of the level control 6 according to the invention will now be explained.

Figure 2:
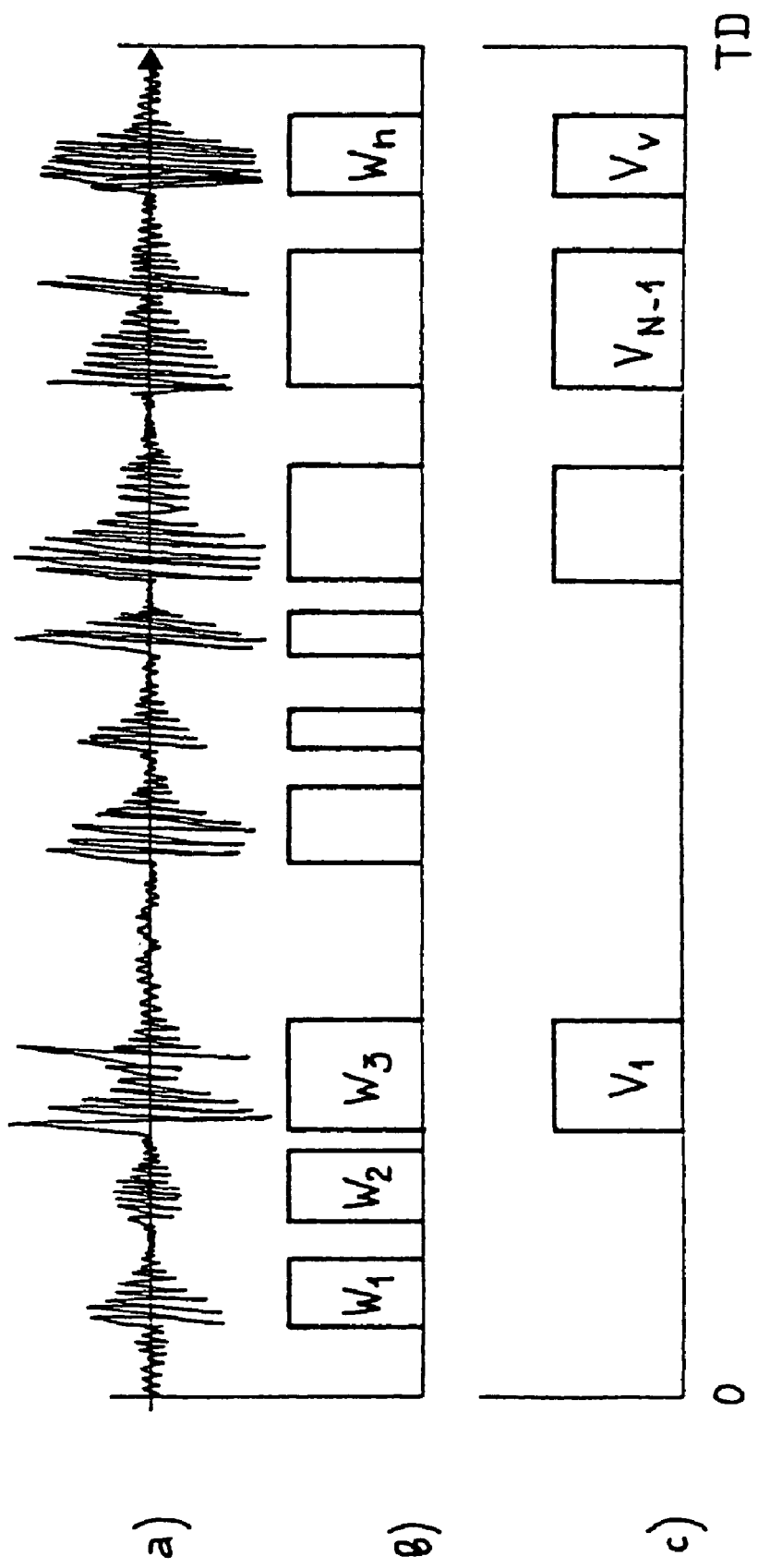
FIGS. 2*a–c* show a diagrammatic representation of the selection of the windows which are decisive for the level control.

FIG. 2*a* shows the variation with time of a voice signal used as test signal in the form of a suggestion. The voice signal has a predetermined length TD of, for example, 3 to 10 seconds. It is characteristic of the voice signal that the energy is not distributed uniformly but is concentrated at the beginnings of words and syllables. The words are separated by silence intervals. From experience, the silence intervals constitute a significant part (e.g. 30% to 50%) of the length TD of the voice signal.

In a first step, the voice intervals are then located which separate the signal sections with voice activity from one another. For this purpose, the signal can be transformed into the frequency domain and processed by means of a discriminator having a predetermined threshold (which is, e.g., 10 dB above the quantization noise). The result of this evaluation is a series of spaced-apart windows W1, W2, W3, . . . , Wn (FIG. 2*b*) which are free of silence intervals.

Next, the windows are identified in which, for example, the spectral energy density of the signal exceeds a certain threshold. The energy density is determined in the frequency domain (particularly on the basis of the Bark classification). The windows are preferably sorted in accordance with the magnitude of the energy density. In this manner, it is possible to determine at the same time how many windows exceed the set threshold value and the magnitude of the sum of the energy of the selected windows with respect to the total energy of the test signal.

Specifically, according to a particularly preferred embodiment, the threshold is selected in such a manner that the windows above the threshold represent at least 60% to 70% of the total energy. (As a rule, this criterion eliminates, in particular, even very short windows). However, it is quite easily possible to use all windows W1, W2, W3, . . . , Wn determined in the first step for the level control.

In the example according to FIG. 2*c*, the selected windows are designated by V1, . . . , VN–1, VN. For each of these windows, the beginning and the end in time (or, respectively, the duration) are stored in addition to the characteristic spectral values of the test signal. This concludes the preparatory phase. The said data are used in the manner explained with reference to FIG. 3 for the level control according to the invention.

Figure 3:
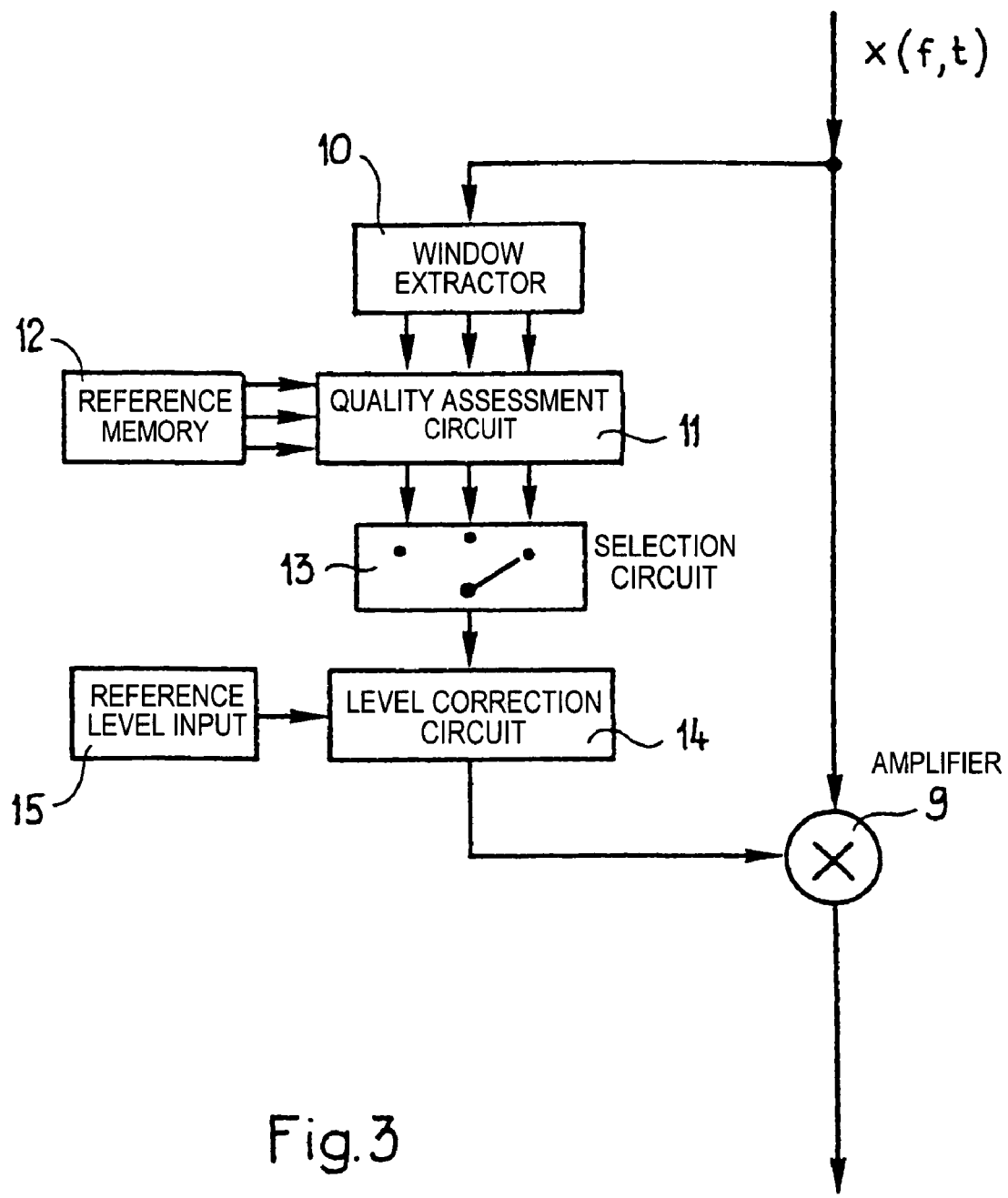
FIG. 3 shows a block diagram of the method for performing the level control.

The block diagram shown in FIG. 3 symbolizes the content of the block 6 shown in FIG. 1. The processed received signal x(f,t) is picked off prior to amplification 9, and supplied to a window extractor 10. This extracts the sections of the received signal x(f,t) falling within the predetermined windows V1, . . . , VN–1, VN. According to the invention, the subsequent signal analysis is restricted to the said sections. That is to say, a selective (quasi-"local") quality assessment 11 is carried out for each selected signal section. The quality assessment 11 operates in the same manner as the "global" quality assessment 7 (compared to FIG. 1) following the level control 6. Known methods can be used such as, for example, the BSD or the Cepstral method.

The selective quality assessment 11 is based on the values of the undistorted test signal, contained in the reference memory 12. At the output of the quality assessment 11, at least one value is available for each predetermined window V1, . . . , VN–1, VN. This value characterizes the similarity of the received signal x(f,t) to the original test signal in the respective window. If, for example, there was a short interruption in a particular window, e.g. in V1, during the transmission, the similarity will then be slight in this window.

In the subsequent selection circuit 13, the window with the greatest similarity value is determined. In principle, all windows the similarity value of which exceeds a predetermined threshold can also be selected. Whenever (at least) one window with a signal section of sufficient quality (Qi>Qmin) is found, the gain factor is adapted in this case (if the quality is inadequate the previous gain factor is retained).

In the subsequent level correction 14, the gain factor is calculated in accordance with a formula known per se, e.g. L=20*log (Eref/Esig), where "Eref" is the stored reference value and "Esig" is the received signal energy in the given time interval. If only a single window is analyzed in the selection circuit 13, the received level can then be compared with the reference level 15 for this window. If a number of windows are selected, then the required gain factor can be calculated, for example, for each individual window so as then to determine a mean value.

The gain factor obtained on the basis of a single window (or of a few windows) is used for the amplification of the entire signal x(f,t) (amplification 9) according to the invention.

The quality assessment 7 which, according to the invention, is also used for the level control 6 (where, however, it is restricted to selected windows) can be performed in a manner known per se. In the text which follows, a suitable method will be described briefly by way of example.

The Bark spectrum L(i) reflects the non-linear transforms of frequency and amplitude of the human ear together with important aspects of the frequency analysis and spectral integration characteristics in complex acoustic events. According to the present embodiment, the quadratic Euclidean distance between two Bark spectral vectors is determined. This value, known as BSD (Bark Spectral Distortion) can be described by the following formulae:

$$BSD = BSD_u / E_{Bark}$$

$$BSD_u = \text{Ave}[BSD^{(k)}]$$

$$E_{bark} = \text{Ave}_k \sum_{i=1}^{N} [L_x^{(k)}(i)]^2$$

$$BSD^{(k)} = \sum_{i=1}^{N} [L_x^{(k)}(i) - L_y^{(k)}(i)]^2$$

where $$L_x^{(k)}(i), L_Y^{(k)}(i)$$

designate the Bark spectrum of the kth segment of the test signal or, respectively, of the corresponding segment of the transmitted received signal. (Further details of the BSD method can be found in the prior art of Shihua Wang et al. quoted initially).

The invention is not restricted to the assessment of the transmission quality of voice signals. Instead, it can be used wherever a known test signal is transmitted via a transmission link with pronounced non-linear distortion and then qualitatively assessed. For example, systems for transmitting images can be mentioned.

One feature of the invention is the subdivision of the test signal into a plurality of small windows and the calculation of the transmission quality in these selected windows. The window having the best transmission quality is used for determining the sound intensity of the total received signal. Signal sections having a low power (such as, for example, silence intervals in voice signals or image areas without structure in image signals) are not taken into consideration in the level control. (To avoid misunderstandings, it is pointed out that, naturally, the entire signal—and not only the selected windows—is taken into consideration in the quality assessment 7).

Within the level control according to the invention, a provisional adaptation of the levels with reference to the selected windows can be performed. If permitted by the comparison method, an adaptation of the levels can be omitted in this context.

In summary, it can be asserted that the invention eliminates a systematic error in the previous quality assessment.

What is claimed is:

1. Method for performing a quality assessment of a signal transmission link having non-linear distortion, in which a predetermined test signal is transmitted from a transmitter to a receiver, the level of the received signal is first adjusted in the receiver and then a global quality assessment is performed by means of a predetermined comparison method, characterized in that, for the purpose of adjusting the level,
    a) a local quality assessment based on the predetermined comparison method is performed in a predetermined number of different, predefined time windows (V1, . . . VN–1, VN), in that
    b) at least one window having adequate local transmission quality is determined, in that
    c) the ratio of the signal level of the test signal to the signal level of the received signal is calculated in at least one of the windows determined, and in that
    d) the level of the total received signal is set on the basis of said ratio.

2. Method according to claim 1, characterized in that only those windows in which the spectral energy density of the test signal exceeds a predetermined threshold are used for the level control.

3. Method according to claim 2, characterized in that the threshold is selected in such a manner that the selected windows together contain at least 50%, preferably about 70% of the total signal energy of the test signal.

4. Method according to claim 3, characterized in that a voice signal is used as a test signal and in that the selected windows are free of silence intervals.

5. Method according to claim 3, characterized in that the transmission quality is determined in accordance with the BSD method.

6. Method according to claim 2, characterized in that a voice signal is used as a test signal and in that the selected windows are free of silence intervals.

7. Method according to claim 2, characterized in that the transmission quality is determined in accordance with the BSD method.

8. Method according to claim 1, characterized in that a voice signal is used as a test signal and in that the selected windows are free of silence intervals.

9. Method according to claim 8, characterized in that the transmission quality is determined in accordance with the BSD method.

10. Method according to claim 1, characterized in that the transmission quality is determined in accordance with the BSD method.

11. Device for carrying out the method according to claim 1, comprising a receiver for receiving a received signal transmitted from a transmitter via a signal transmission link, the receiver comprising a level control for adjusting the level of the received signal, and a quality assessment, characterized in that the level control comprises
   a) a circuit for performing a local quality assessment in a predetermined number of different, predefined time windows,
   b) a circuit for determining at least one window having adequate local transmission quality,
   c) a circuit for calculating the ratio of the signal level of the test signal to the signal level of the received signal in at least one of the windows determined,
   d) an amplifier which adjusts the level of the total received signal on the basis of the said ratio.

12. Method for performing a quality assessment of a signal transmission link having non-linear distortion comprising the steps of:
   transmitting a test signal from a transmitter to a receiver;
   defining a number of time windows;
   determining that the received signal in at least one time window has adequate local transmission quality by performing a local quality assessment of the received signal in a predetermined number of different time windows based on a predetermined comparison method;
   calculating a ratio of a signal level of the test signal to a signal level of the received signal in the at least one time window; and
   setting the level of the total received signal on the basis of said ratio.

13. Method for performing a quality assessment of a signal transmission link having non-linear distortion comprising the steps of:
   transmitting a test signal from a transmitter to a receiver;
   defining a number of time windows;
   selecting at least one of the time windows based on the transmission quality of the received signal in the selected at least one time window;
   calculating a ratio of a signal level of the test signal to a signal level of the received signal in the selected at least one time window; and
   setting the level of the total received signal on the basis of said ratio.

* * * * *